(12) United States Patent
Lewis

(10) Patent No.: US 9,548,605 B2
(45) Date of Patent: Jan. 17, 2017

(54) PROTECTION CIRCUITS AND METHODS FOR ELECTRICAL MACHINES

(75) Inventor: Eric Anthony Lewis, Warwickshire (GB)

(73) Assignee: GE ENERGY POWER CONVERSION TECHNOLOGY LTD. (GB)

( * ) Notice: Subject to any disclaimer, the term of this patent is extended or adjusted under 35 U.S.C. 154(b) by 247 days.

(21) Appl. No.: 13/637,839

(22) PCT Filed: Mar. 14, 2011

(86) PCT No.: PCT/EP2011/001235
§ 371 (c)(1),
(2), (4) Date: Dec. 4, 2012

(87) PCT Pub. No.: WO2011/120631
PCT Pub. Date: Oct. 6, 2011

(65) Prior Publication Data
US 2013/0194704 A1    Aug. 1, 2013

(30) Foreign Application Priority Data

Mar. 30, 2010  (EP) .................................... 10003396

(51) Int. Cl.
*H02H 7/06* (2006.01)
*H02P 29/02* (2016.01)

(52) U.S. Cl.
CPC .............. *H02H 7/06* (2013.01); *H02P 29/02* (2013.01)

(58) Field of Classification Search
CPC ...................................... H02H 7/06
USPC ................. 318/375–381; 290/43, 44; 361/20
See application file for complete search history.

(56) References Cited

U.S. PATENT DOCUMENTS

| 4,311,948 A * | 1/1982 | Brown et al. ................. 318/759 |
| 4,814,675 A | 3/1989 | Perilhon |
| 6,256,181 B1 | 7/2001 | Chinomi et al. |
| 6,938,555 B2 * | 9/2005 | Jockel ....................... B60L 7/06 105/34.1 |
| 7,038,405 B2 * | 5/2006 | Makinen et al. ............... 318/78 |

(Continued)

FOREIGN PATENT DOCUMENTS

| CN | 1241063 A | 1/2000 |
| DE | 2659600 A1 | 7/1978 |

(Continued)

OTHER PUBLICATIONS

Unofficial English translation of CN Office Action issued Apr. 1, 2014 in connection with corresponding CN Patent Application No. 201180017866.8.

(Continued)

*Primary Examiner* — Bentsu Ro
(74) *Attorney, Agent, or Firm* — Wood IP LLC

(57) ABSTRACT

An assembly includes an electrical machine connected to a power converter by a three-phase circuit having three conductors, e.g. cables Each conductor is associated with a switching device such as a contactor or the like that connects the conductor to a common conductor or terminal. In the event of a fault current being developed in the circuit or the power converter the switching devices are operated to close the fault current and connect together the conductors of the three-phase circuit to provide a full three-phase short circuit.

14 Claims, 4 Drawing Sheets

(56) References Cited

U.S. PATENT DOCUMENTS

| | | | |
|---|---|---|---|
| 7,372,227 B2 * | 5/2008 | Rainer et al. | 318/375 |
| 7,786,608 B2 * | 8/2010 | Menke | 290/44 |
| 2003/0086218 A1 | 5/2003 | Folliot | |
| 2005/0067984 A1 | 3/2005 | Makinen et al. | |
| 2009/0174349 A1 * | 7/2009 | Iwashita | H02P 3/18 318/400.06 |
| 2013/0194704 A1 | 8/2013 | Lewis | |

FOREIGN PATENT DOCUMENTS

| | | |
|---|---|---|
| EP | 0974483 A2 | 1/2000 |
| EP | 1521356 A2 | 4/2005 |
| EP | 2372860 A1 | 10/2011 |
| JP | 2000179446 A | 6/2000 |
| WO | 2011120631 A1 | 10/2011 |

OTHER PUBLICATIONS

Office Action and Search Report issued Jul. 21, 2016 in corresponding Canadian Appl. No. 2,794,382.

\* cited by examiner

PROTECTION CIRCUITS AND METHODS FOR ELECTRICAL MACHINES

CROSS-REFERENCE TO RELATED APPLICATIONS

The instant invention is related to and/or claims priority to the following related applications: (1) as a 371 international continuation of national stage PCT/EP2011/001235 application filed on Mar. 14, 2011 (also referenced as WO 2011/120631) having a 371 date of Dec. 4, 2012; and (2) related application EP 10003396.8 Great Britain having a Foreign Application Priority file date of Mar. 30, 2010, both incorporated by reference in their entirety; and all having the same inventor Eric Anthony Lewis.

FIELD OF THE INVENTION

The present invention relates to protection circuits and methods for electrical machines, and in particular for generators that are driven by renewable energy turbine assemblies (e.g. wind turbines) or electrical motors.

BACKGROUND OF THE INVENTION

It is possible to convert renewable energy such as wind, wave, tidal energy or water current flows into electrical energy by using a turbine to drive the rotor of an ac generator, either directly or by means of a gearbox. The ac frequency that is developed at the stator terminals of the generator (the "stator voltage") is directly proportional to the speed of rotation of the rotor. The voltage at the stator terminals also varies as a function of speed and, depending on the particular type of generator, on the flux level. For optimum energy capture, the speed of rotation of the output shaft of the renewable-energy turbine will vary according to the speed of the wind or water current flows driving the blades of the turbine assembly. Matching of the variable voltage and frequency of the generator to the nominally constant voltage and frequency of the power network can be achieved by using a power converter.

The power converter may have any suitable topology (e.g. a two- or three-level pulse width modulated inverter) and is typically connected to the generator by a suitable circuit. For example, the circuit may include one or more conductors or cables for each phase of the generator.

A typical ac synchronous generator includes a field system mounted on the rotor surrounded by a stator winding mounted on the stator. The stator winding may be formed from one or more separate windings, each having n phases. Three phases (i.e. n=3) would be typical, but other phase numbers are possible in some cases. Each winding includes a plurality of coils that are located in winding slots formed in a surface of the stator assembly. The rotor provides a rotating magnetic field generated by conventional windings with slip rings or brushless excitation power supply. The turbine drives the rotor to rotate and ac power is provided by the stator winding.

Such an arrangement might experience a number of different faults during its operation. For example, a short circuit could occur between two or more of the conductors that form the n-phase circuit between the generator and the power converter, or within the power converter itself. In the event of a short circuit or fault then the generator will develop a fault current that can cause unacceptable damage if it is not properly controlled.

In the case of a generator where the rotating field system is provided by a field winding then the rotor flux can very quickly be set to zero by the power converter or external circuitry. This will also set the stator voltage to zero and remove the fault current.

For renewable energy applications then permanent magnet generators offer considerable benefits such as reduced losses, improved efficiency, and the ability to operate at very low rotational speeds so that the gear box between the turbine assembly and the rotor can either be eliminated completely or reduced in complexity. However, if the rotating field system uses permanent magnets then the rotor flux remains substantially constant at all times. This means that if a fault current develops then it cannot be reduced by the power converter or external circuitry. The only way to bring the fault current to zero is to bring the rotational speed of the turbine assembly to zero by controlling the turbine blades. It will be readily appreciated that for large wind turbines this cannot be done quickly and it might take several seconds to bring the generator rotor to a complete stop. A fault current can therefore inflict significant damage on the generator, e.g. by de-magnetizing the permanent magnets which would make the generator incapable of producing electrical energy.

A particular concern is where a fault current is developed as a result of a short circuit between less than n conductors of the n-phase circuit between the generator and the power converter. For example, in the case of a typical circuit where the stator winding has three phases then the effect on the generator can actually be more severe if the short circuit is between just two of the conductors than if it is between all three of the conductors. A short circuit between less than n conductors can result in severe overheating of the permanent magnets and high levels of vibration that can damage the turbine assembly.

One way of eliminating the risk of de-magnetizing the permanent magnets is to raise the electrical impedance of the generator. This can reduce the fault current to a magnitude that will not de-magnetize the permanent magnets. Fuses have also been included as part of the n-phase circuit but they give little practical protection since the raised electrical impedance of the generator typically results in a fault current that is too low to trip and cause the fuses to blow.

Another option is to use series contactors (e.g. a relay device with a contact for each phase), or similar switching devices, in the n-phase circuit between the generator and the power converter. The most recent designs of permanent magnet generators for renewable energy applications, and in particular those that operate without gearboxes, have a very low rotational speed and the ac frequency that is developed at the stator terminals of the generator is also very low. The contactors must therefore have the ability to interrupt the fault current at these low frequencies, which requires the use of very expensive DC rated contactors.

SUMMARY OF THE INVENTION

The present invention provides an assembly comprising an electrical machine (e.g. a generator or motor) having at least one n-phase stator winding connected to a power converter by an n-phase circuit having n conductors, wherein each conductor is associated with a switching device that connects the conductor to a common conductor such that when the switching devices are operated in the event of a fault current the conductors of the n-phase circuit are connected together to provide a full n-phase short circuit.

As used herein, the term "full n-phase short circuit' means a short circuit that is between all n conductors of the n-phase circuit that connects the stator winding of the electrical machine to the power converter. In other words, each of the n conductors is preferably connected to the common conductor or terminal in parallel by an associated switching device which is operated to be in a closed state in the event of a fault current being developed. The switching devices are preferably operated to open and close under the control of a suitable controller which responds to a fault current.

The conductors of the n-phase circuit can be provided in any suitable arrangement (e.g. one or more cables for each phase) and are preferably connected between the stator terminals of the electrical machine and input terminals of the power converter. Each conductor carries a respective phase of the stator winding.

In a typical example, the stator winding will have a plurality of coils defining three phases (i.e. n=3).

The electrical machine may have w stator windings, each winding having a plurality of coils defining n phases. In a typical example, the electrical machine will have one or two stator windings (i.e. w=1 or 2). If the electrical machine has more than one stator winding, then the stator windings may be connected to the same power converter or to different power converters by separate n-phase circuits. The conductors of the separate n-phase circuits may be connected to the same common conductor or to different common conductors. In other words, if the electrical machine has more than one stator winding, then each conductor of the n-phase circuit associated with one of the stator windings may be connected in parallel to a first common conductor by an associated switching device and each conductor of the n-phase circuit associated with another of the stator windings may be connected in parallel to a second common conductor by an associated switching device. Such an arrangement will provide two full n-phase short circuits but with separate common conductors.

In general terms, a total of w set(s) of n conductors and associated switching devices would be needed for the protection circuit.

The present invention further provides a method of protecting an electrical machine having at least one n-phase stator winding connected to an n-phase circuit having n conductors, wherein each conductor is associated with a switching device, the method comprising the step of: in the event of a fault current, operating the switching devices to connect the conductors of the n-phase circuit together to provide a full n-phase short circuit.

The switching devices preferably connect the conductors of the n-phase circuit to a common conductor or terminal.

If the electrical machine has two or more stator windings, each having n-phases, then all of the switching devices are preferably operated to connect the conductors of each n-phase circuit together in the event of a fault current being developed in any one of the n-phase circuits. In other words, the protection method is preferably applied to all of the n-phase circuits simultaneously.

The fault current may be developed as the result of a short circuit between n or less than n of the conductors in any one of the n-phase circuits or within the power converter.

In the case where the electrical machine is driven by a renewable energy turbine assembly (e.g. a wind turbine) then the method may further comprise the step of controlling the turbine assembly to stop rotating. In exemplary embodiments, the fault current can be brought to zero by bringing the rotational speed of the turbine assembly (and hence the rotational speed of the electrical machine) to zero by controlling the turbine blades.

The electrical machine is preferably a generator but may, in some cases, be required to operate as a motor.

The electrical machine may be a permanent magnet generator (i.e. where the rotating field system uses high energy permanent magnets to provide the rotor flux). The invention is also particularly useful for electrical machines where the rotating field system uses a rotor winding with rotor coils made from high temperature superconducting (HTS) materials, as they cannot normally change their flux rapidly, due to the high levels of stored magnetic energy and cannot implement a rapid reduction in the rotor flux, in the event of a fault current being developed.

The protection circuit and method are intended to complement any appropriate internal design of the stator winding and other technical features that keep fault currents within acceptable limits to prevent the permanent magnets from being de-magnetized. In this case, the switching devices can be rated for a reduced fault current. If the electrical machine is not already designed to have an inherently low fault current then the switching devices must normally be rated for an increased fault current. In either case, the protection circuit and method will provide enhanced protection by avoiding the effects of unbalanced fault currents.

The switching devices are preferably contactors or similar devices.

Ensuring a full n-phase short circuit in the event of a fault current being developed means that the more severe electrical effects of a short circuit between less than n-phases are eliminated. Another advantage is that low cost AC rated contactors can be used instead of the very expensive DC rated contactors. This is because the contactors only need to close the fault current rather than open it.

The contactors or switching devices for the conductors of the n-phase circuit can be separate devices or formed as a single, composite, device.

BRIEF DESCRIPTION OF THE DRAWINGS

Exemplary embodiments of the invention will now be described, with reference to the accompanying drawings, in which.

DETAILED DESCRIPTION OF THE INVENTION

Figure 1:
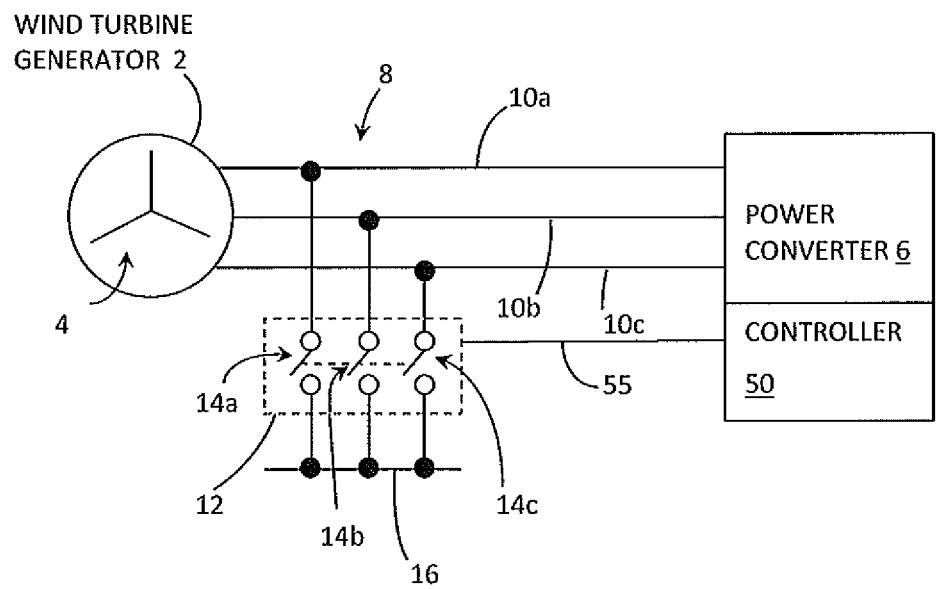
FIG. 1 is a schematic drawing showing an assembly according to an exemplary embodiment where a generator has a single three-phase stator winding.

FIG. 1 shows a permanent magnet wind turbine generator 2 with a single three-phase stator winding 4. The stator terminals are connected to a power converter 6 by a three-phase circuit 8. More particularly, the circuit 8 includes three separate cables or conductors 10a, 10b and 10c each carrying a respective phase of the stator winding 4.

The rotor of the wind turbine generator 2 is driven by a wind turbine assembly (not shown) having any suitable number of turbine blades.

Figure 3:
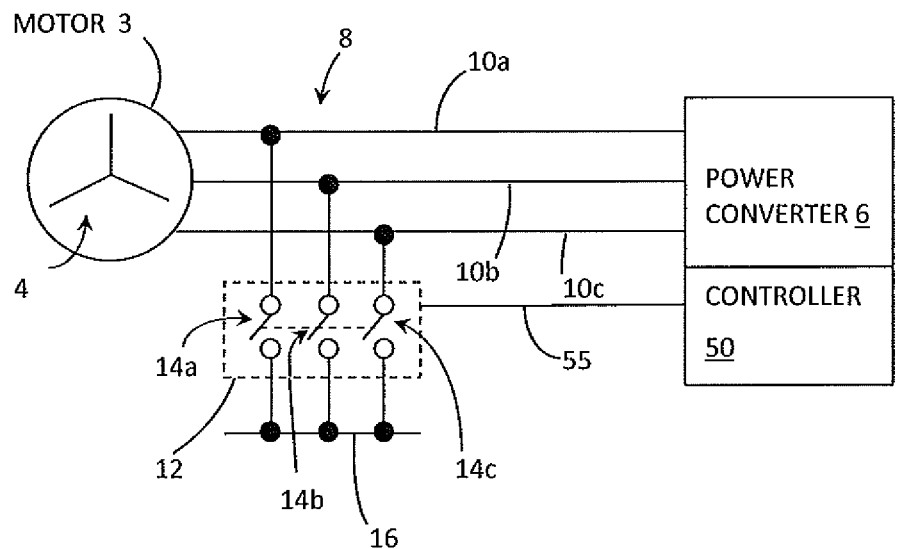
FIG. 3 is a schematic drawing showing an assembly according to an exemplary embodiment where a motor has a single three-phase stator winding.
Figure 4:
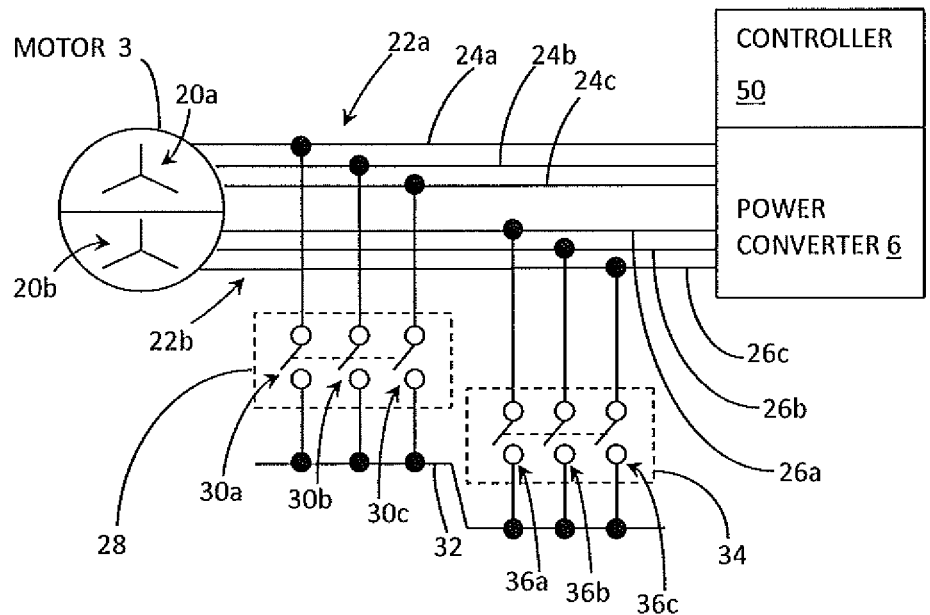
FIG. 4 is a schematic drawing showing an assembly according to another exemplary embodiment where the motor has two three-phase stator windings.
Figure 5:
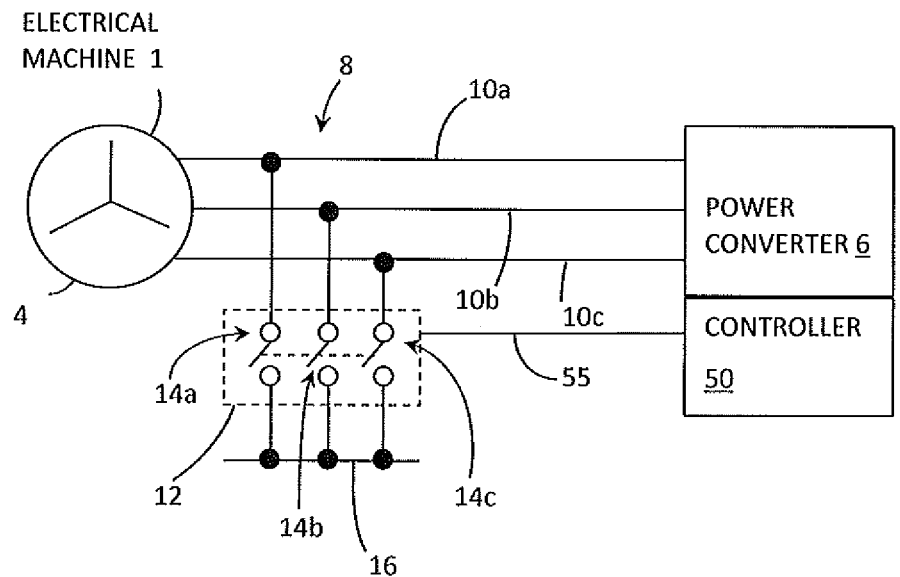
FIG. 5 is a schematic drawing showing an assembly according to an exemplary embodiment where an electrical machine has a single three-phase stator winding.
Figure 6:
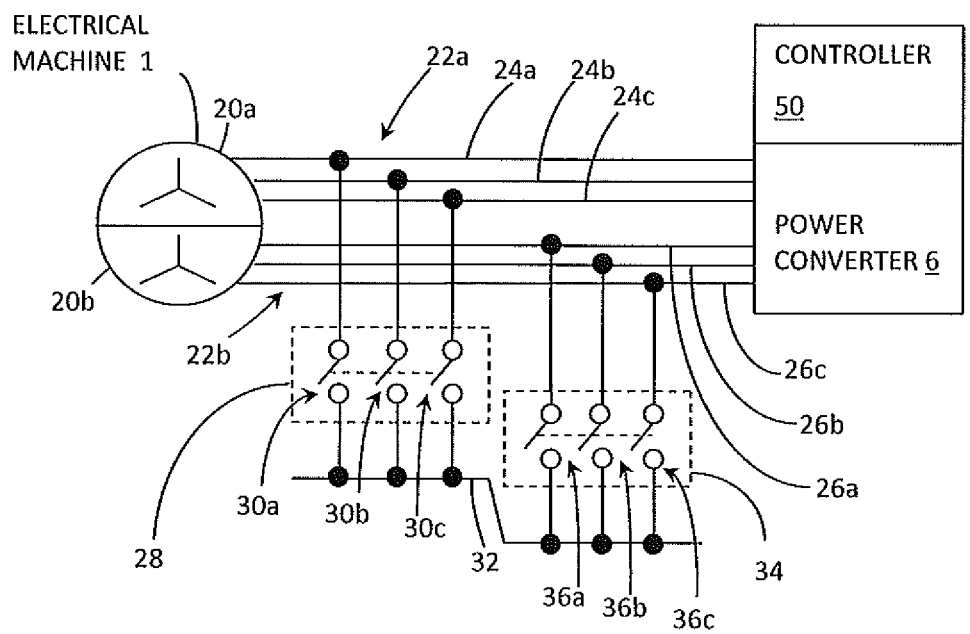
FIG. 6 is a schematic drawing showing an assembly according to another exemplary embodiment where the electrical machine has two three-phase stator windings.
Figure 7:
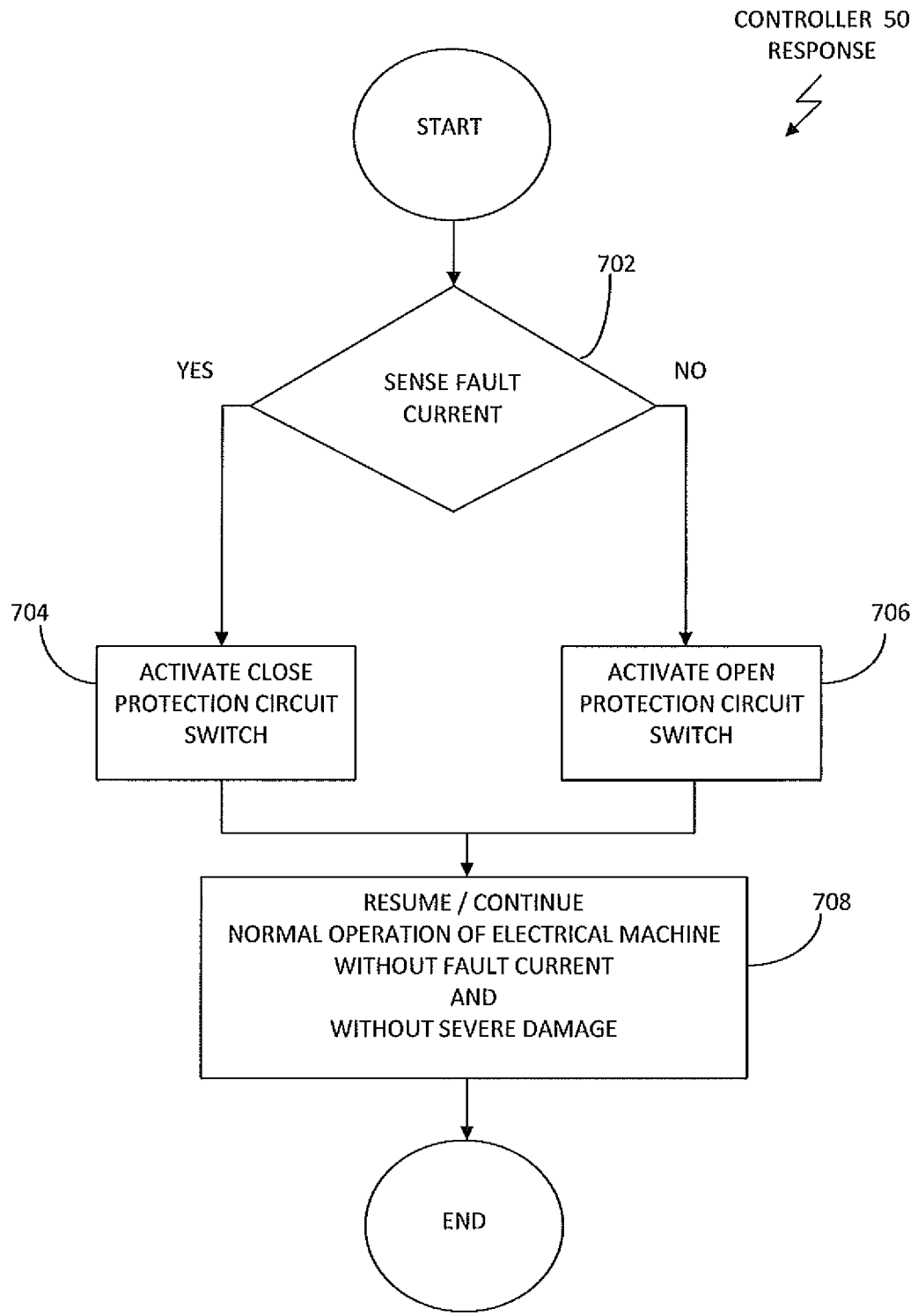
FIG. 7 is a schematic drawing showing controller response to sensing fault current.

Referring to FIG. 1, FIG. 3, and FIG. 5, a multiple pole single throw contactor device 12 (such as a triple pole single throw switching device) includes three separate contacts 14a, 14b and 14c. Each of the separate contacts is connected between one of the cables 10a, 10b and 10c and a common conductor or terminal 16. Each of the cables 10a, 10b and 10c is therefore connected in parallel to the common conductor 16 by means of an associated contact of the contactor device 12.

When the wind turbine generator 2 is operating normally the contacts 14a, 14b and 14c are open and electrical power flows from the stator terminals of the wind turbine generator 2 to the power converter 6 through the circuit 8.

Referring to FIG. 1, FIG. 3, FIG. 5 and FIG. 7, if there is a short circuit or fault in the circuit 8 or the power converter 6 then the wind turbine generator 2 will start to produce a fault current. This can be sensed 702 by a controller 50 and the contacts 14a, 14b and 14c can be closed 704 to connect the cables 10a, 10b and 10c of the circuit 8 to the common conductor 16. It will be readily appreciated that closing the contacts using lead 55 (or other conventional circuitry not shown, activated by the controller 50) will create a full three-phase short circuit which protects the wind turbine generator 2 from the most severe electrical effects of a two-phase short circuit. The turbine assembly is also controlled to bring the wind turbine generator 2 to a complete stop as quickly as possible and bring the fault current to zero.

Once the contacts 14a, 14b and 14c are closed 704 then no fault current will flow from the wind turbine generator 2 to the power converter 6. The addition of the contactor device 12 therefore minimizes any risk of the power converter 6 being damaged 708.

The contacts 14a, 14b and 14c of the contactor device 12 can be opened 706 again once the fault current has cleared.

Figure 2:
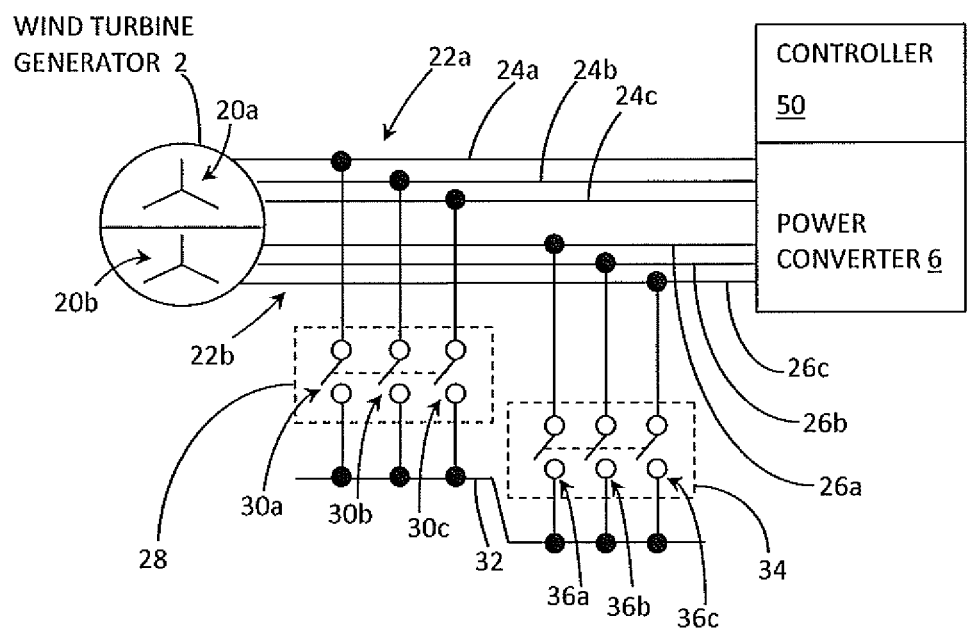
FIG. 2 is a schematic drawing showing an assembly according to another exemplary embodiment where the generator has two three-phase stator windings.

FIG. 2 shows a permanent magnet wind turbine generator 2 with two separate stator windings 20a and 20b. The stator terminals are connected to a power converter 6 by two three-phase circuits 22a and 22b. More particularly, the first circuit 22a includes three separate cables or conductors 24a, 24b and 24c each carrying a respective phase of the first stator winding 20a; and the second circuit 22b includes three separate cables or conductors 26a, 26b and 26c each carrying a respective phase of the second stator winding 20b.

The rotor of the wind turbine generator 2 is driven by a wind turbine assembly (not shown) having any suitable number of turbine blades.

A contactor device 28 for the first circuit 22a includes three separate contacts 30a, 30b and 30c. Each of the separate contacts is connected between one of the cables 24a, 24b and 24c and a common conductor or terminal 32. Each of the cables 24a, 24b and 24c is therefore connected in parallel to the common conductor 32 by means of an associated contact of the contactor device 28.

A contactor device 34 for the second circuit 22b includes three separate contacts 36a, 36b and 36c. Each of the separate contacts is connected between one of the cables 26a, 26b and 26c and the common conductor or terminal 32. Each of the cables 26a, 26b and 26c is therefore connected in parallel to the common conductor 32 by means of an associated contact of the contactor device 34. It will be readily appreciated that the cables 26a, 26b and 26c could alternatively be connected to a separate common conductor or terminal (not shown).

When the wind turbine generator 2 is operating normally, the contacts of the first and second contactor devices 28 and 34 are open and electrical power flows from the stator terminals of the wind turbine generator 2 to the power converter 6 through the first and second circuits 22a and 22b.

If there is a short circuit or fault in one of the first and second circuits 22a or 22b or the power converter 6, then the wind turbine generator 2 will start to produce a fault current. This can be sensed by a controller 50 and the contacts of the first and second contactor devices 28 and 34 can be closed to connect the cables of the first and second circuits 22a and 22b to the common conductor 32. It will be readily appreciated that closing the contacts will create a full three-phase short circuit in each of the first and second circuits 22a and 22b which protects the wind turbine generator 2 from the most severe electrical effects of a two-phase short circuit. The turbine assembly is also controlled to bring the wind turbine generator 2 to a complete stop as quickly as possible and bring the fault current to zero.

Once the contacts of the first and second contactor devices 28 and 34 are closed then no fault current will flow from the wind turbine generator 2 to the power converter 6. The addition of the contactor devices 28 and 34 therefore minimizes any risk of the power converter 6 being damaged.

The contacts of the contactor devices 28 and 34 can be opened again, once the fault current has cleared.

These fault protection operations are readily applicable to motors and other electrical machines, such as motor 3 and electrical machine 1, as illustrated in FIG. 3-FIG. 4 and FIG. 5-FIG. 6, respectively.

What is claimed:

1. An electrical machine having an at least one multiple-phase stator winding connected to a power converter in a multiple-phase circuit by a group of cables each carrying a respective phase of the multiple-phase circuit, the machine comprising:
   an electrical protection circuit including a switching device including a group of contacts connected between the electrical machine and the power converter via a first connection;
   a controller communicatively connected to the power converter and to the electrical protection circuit, wherein the controller is configured to sense fault current and configured to activate the electrical protection circuit; and
   a common conductor connected to the group of contacts of the electrical assembly via a second connection opposite the first connection,
   wherein each cable of the group of cables is connected in parallel to the common conductor by a separate contact of the group of contacts, and when a fault occurs, the group of contacts is closed to connect each cable of the group of cables to the common conductor and to short-circuit a total of the respective phases of the multiple-phase circuit.

2. The electrical assembly of claim 1, wherein when closing the contacts a full multiple phase direct short circuit at zero fault current in the at least one multiple phase stator winding connected to the power converter occurs.

3. The electrical assembly of claim 1, wherein the group of contacts comprise AC contacts.

4. The electrical assembly of claim 3, wherein the electrical machine is a permanent magnet motor.

5. The electrical assembly of claim 3, wherein the electrical machine has a rotating field system that uses a rotor winding with rotor coils made from high temperature superconducting materials.

6. An electrical machine having an electrical protection circuit, the electrical machine comprising:
- a power converter electrically connected to the electrical machine in a multiple-phase circuit by a group of cables, wherein the electrical machine is a multiple phase motor having an at least one multiple-phase stator winding;
- the electrical protection circuit including a switching device including a group of contacts connected between the electrical machine and the power converter via a first connection;
- a controller communicatively connected to the power converter and to the electrical protection circuit, wherein the controller is configured to sense fault current and configured to activate the electrical protection circuit;
- a common conductor connected to the group of contacts of the electrical protection circuit by a second connection opposite the first connection, wherein each cable of the group of cables is connected in parallel to the common conductor by a separate contact of the group of contacts, and when a fault occurs the group of contacts is closed to connect each cable of the group of cables to the common conductor and to short-circuit a total of the respective phases of the multiple-phase circuit.

7. The electrical machine of claim 6, wherein when closing the group of contacts a full multiple-phase short circuit of fault current in the at least one multiple phase stator winding residing in the multiple phase motor.

8. The electrical machine of claim 6, wherein the open connection is free of fault current and free of any short circuit in each cable of the group of cables connected to the power converter.

9. The electrical machine of claim 6, wherein the switching device includes a multiple pole single throw switching device having AC contactors.

10. The electrical machine of claim 6, wherein the at least one multiple phase motor is a permanent magnet motor.

11. The electrical machine, according to claim 6, wherein the electrical protection circuit comprises two multiple pole single throw switching devices having AC contactors connecting a first group of cables and a second group of cables to the common conductor, when the electrical machine includes two 3-phase stator windings.

12. A method of protecting an electrical machine having an at least one 3-phase stator winding electrically connected to a power converter by a group of three separate cables, each cable carrying a respective phase of the at least one 3-phase stator winding, wherein the electrical machine further having a common conductor connected in parallel to each cable of the group of three separate cables by an associated contact of an electrical protection circuit, wherein the electrical protection circuit including a switching device including a group of contacts between the electrical machine and the power converter and the electrical machine further having a controller communicatively connected between the power converter and the electrical protection circuit the method comprising:
- sensing, by the controller, a fault current;
- activating the electrical protection circuit to close the associated contact connected to each cable of the group of three separate cables based on the fault current sensed; and
- short-circuiting a total of the respective phases.

13. The method of protecting the electrical machine, according to claim 12, wherein closing the contacts causes a full 3-phase direct short circuit bringing any fault current to zero in the electrical machine.

14. The method of protecting the electrical machine, according to claim 12, wherein the electrical machine is a permanent magnet motor.

* * * * *